United States Patent [19]

Jelley et al.

[11] Patent Number: 5,377,027
[45] Date of Patent: Dec. 27, 1994

[54] LIQUID CRYSTAL DISPLAY DEVICE WITH PIXEL REGISTRATION ILLUMINATION

[75] Inventors: Kevin W. Jelley, Lagrange Park; George T. Valliath, Buffalo Grove; William M. Beckenbaugh, Barrington, all of Ill.

[73] Assignee: Motorola, Inc., Schaumburg, Ill.

[21] Appl. No.: 955,968

[22] Filed: Oct. 2, 1992

[51] Int. Cl.⁵ .......................................... G02F 1/1335
[52] U.S. Cl. ...................................... 359/48; 362/27; 362/26; 362/31; 354/49
[58] Field of Search ...................... 359/42, 48, 49, 50; 362/67, 31, 26, 27

[56] References Cited

U.S. PATENT DOCUMENTS

| | | | |
|---|---|---|---|
| 4,043,636 | 8/1975 | Eberhardt et al. | 359/48 |
| 4,487,481 | 12/1984 | Suzawa | 358/69 |
| 4,798,448 | 1/1989 | van Raalte | 359/41 |
| 4,838,661 | 6/1989 | McKee et al. | 359/48 |
| 5,101,279 | 3/1992 | Kurematsu et al. | 359/40 |
| 5,128,786 | 7/1992 | Yanagisawa | 359/67 |
| 5,151,801 | 9/1992 | Hiroshima | 359/40 |

FOREIGN PATENT DOCUMENTS 0127299 10/1979 Japan .
0068814 3/1988 Japan .
0182719 8/1991 Japan .

OTHER PUBLICATIONS

Blumenfeld et al., "Parts That Glow", *Machine Design* (Oct. 29, 1959) pp. 94–103.
Stanley Electric, "LCD Liquid Crystal Display".
A. H. Firester, "Silicon Transistor Active Matrix Liquid Crystal Displays", *Solid State Technology* (Dec. 1988) pp. 63–67.

*Primary Examiner*—William L. Sikes
*Assistant Examiner*—Kenneth Parker
*Attorney, Agent, or Firm*—Douglas D. Fekete

[57] ABSTRACT

A liquid crystal display device, (10 in FIG. 1) comprises a liquid crystal panel (12) and a backside illuminator (14). The liquid crystal includes pixels (36) separated by a matrix area (37). The backside illuminator comprises a waveguide (40) having a face (44) facing the backside (18) of the liquid crystal panel and including light-emitting sites (48) disposed in registration with the pixels and separated by non-emitting surface (46). During operation, light received from a suitable source (52, 54, 56) is transmitted within the waveguide to the sites and emitted to illuminate the corresponding pixels.

6 Claims, 2 Drawing Sheets

LIQUID CRYSTAL DISPLAY DEVICE WITH PIXEL REGISTRATION ILLUMINATION

BACKGROUND OF THE INVENTION

This invention relates to a light-emitting liquid crystal display device having a backside illuminator. More particularly, this invention relates to such device wherein the backside illuminator includes light-emitting sites in registration with pixels of a liquid crystal panel.

A typical liquid crystal display device forms a display that is viewed through a front side and features an array of pixels, each of which has a bright or dark appearance. The device includes a liquid crystal panel comprising a layer of liquid crystal material sandwiched between front and back transparent polymer or glass plates and between front and back polarizers having perpendicular axis of polarization. The pixels are defined by transparent electrodes adjacent the liquid crystal layer. Light illuminating the back side of the panel is filtered by the back polarizer to admit only polarized light. In the absence of an applied electrical field, the polarized light is re-oriented by the liquid crystal layer to pass through the front polarizer, thereby creating a bright pixel for the display. However, an electrical potential applied between the electrodes alters the intermediate liquid crystal material to prevent the polarized light from passing through the front polarizer, thereby creating a dark pixel. Thus, by selectively applying electrical current to the electrodes, the pixel is switchable between a transparent or bright state and an opaque or dark state.

In addition to the pixels, the display also includes a matrix area. As used herein, matrix refers to the area that surrounds the pixel and separates the pixel from adjacent pixels. The matrix is mainly derived from spacing that is required to electrically isolate the electrodes that define the pixel. In a typical display comprising an array of pixels, the matrix appears as intersecting lines interposed between rows and columns of pixels.

While the liquid crystal panel creates a display by altering the light transmission properties of the pixels, the liquid crystal panel does not generate the light for the display. Thus, the device requires a separate light source. In a backlit device of the type to which this invention relates, the back side of the liquid crystal panel is illuminated by light from an electric light source, such as a light bulb or a light-emitting diode. It is known to utilize a light panel to distribute light and avoid hot spots in the display. Light from the light source is directed into the light panel, typically at an edge, and is emitted from a face toward the back side of the liquid crystal panel. The back of the light panel may include irregularities, for example, bumps or dimples, to disperse the light through the front face. In designing a light panel, heretofore, it has been a common desire to provide a diffuse light to uniformly illuminate the liquid crystal panel, including both pixels and matrix.

Whereas it is desired to minimize the thickness of the display device, light panels designed for diffuse light contribute significantly to the total thickness. Also, because the light source in portable devices is powered by a battery, it is desired to minimize the power requirements for the light source and thereby extend operating time, while providing adequate light to assure pixels of sufficient brightness to allow the display to be readily discerned. However, a significant amount of light irradiates the matrix and is not utilized in forming the display. In addition, diffuse rays irradiate the liquid crystal panel at varying angles, thereby blurring the perimeters of the pixels and reducing resolution of the display.

DESCRIPTION OF THE DRAWINGS

The present invention will be further illustrated with reference to the accompanying drawings wherein.

DETAILED DESCRIPTION OF PREFERRED EMBODIMENTS

Figure 1:
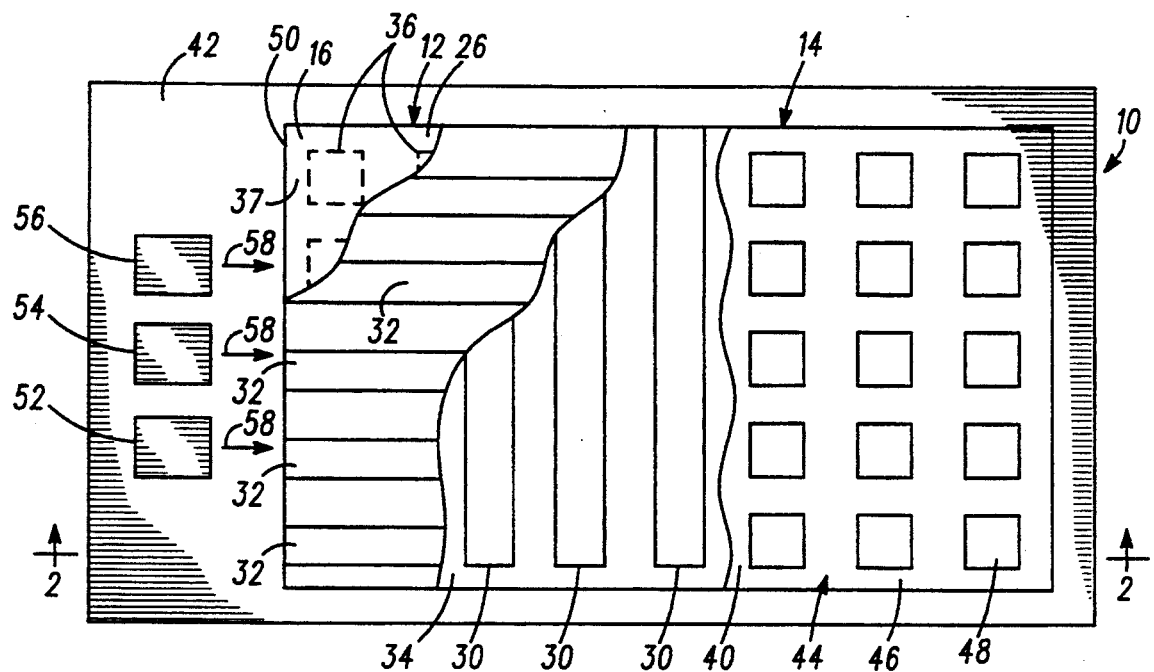
FIG. 1 is a plan view, partially cut-away, of a liquid crystal display device in accordance with this invention.
Figure 2:
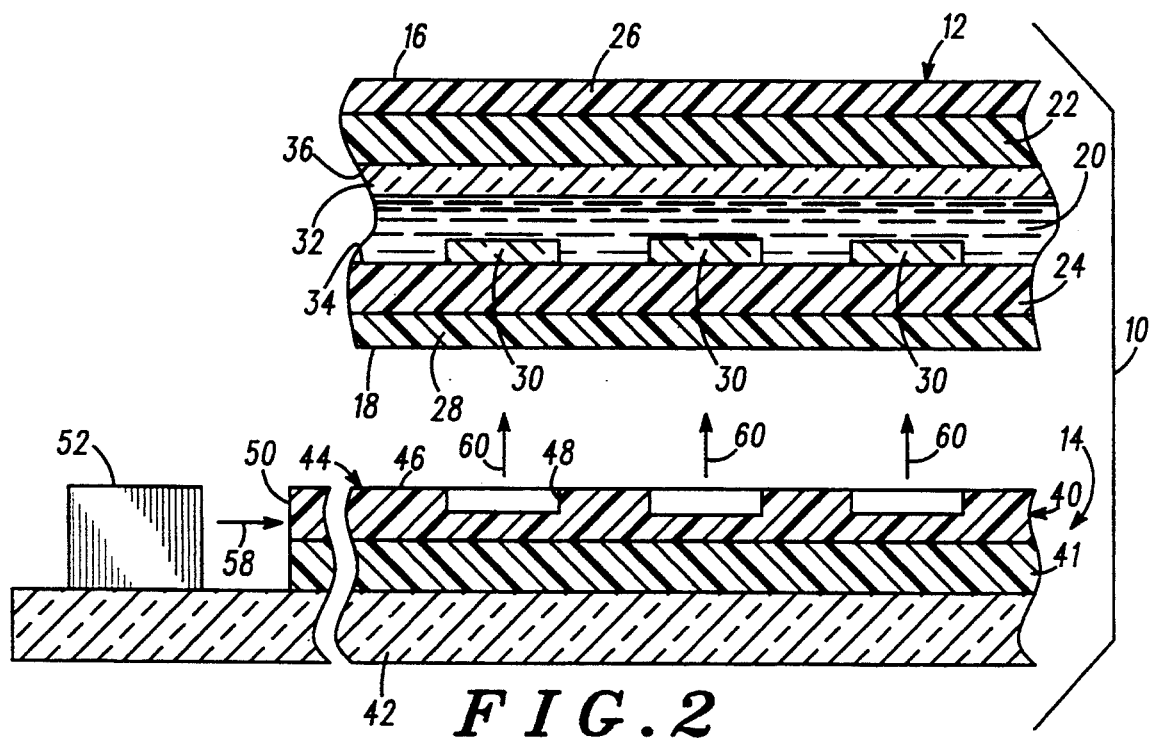
FIG. 2 is a cross sectional view of the liquid crystal display device in FIG. 1, taken along the line 2—2.

In a first preferred embodiment of this invention, referring to FIGS. 1 and 2, a liquid crystal display device 10 comprises a liquid crystal display panel 12 and a backside illuminator 14.

Liquid crystal display panel 12 is adapted to form a display that is viewed through a front side 16. Light for the display is admitted through a back side 18, opposite front side 16. Panel 12 comprises a liquid crystal layer 20 interposed between front and back transparent polymeric plates 22 and 24, respectively. Layer 20 is preferably formed of a twisted neumatic liquid crystal material. Panel 12 further comprises a front polarizer 26 affixed to the outer surface of plate 22, and a back polarizer 28 affixed to the outer surface of plate 24. Polarizers 26 and 28 have axes of polarization oriented in perpendicular directions.

In this embodiment, liquid crystal panel 12 is adapted for producing a display that is formed of a plurality of pixels 36 arranged in a regular array. For purposes of clarity of illustration, only a relatively small number of pixels are depicted, whereas typical displays include up to several thousand pixels that are closely spaced so that adjacent pixels in similar condition cooperate to form light or dark fields of the display. By way of an example of a conventional liquid crystal panel suitable for use with this invention, panel 12 has a simple matrix drive system that includes a first series of electrodes 30 arranged in rows and a second series of electrodes 32 arranged in columns. Electrodes 30 are disposed in parallel on inner surface 34 of back plate 24 and are spaced apart to electrically isolate the electrodes. Electrodes 30 feature rubbed outer surfaces in contact with liquid crystal layer 20 that orient the adjacent liquid crystal molecules in a first direction. Similarly, electrodes 32 are disposed on inner surface 36 of front plate 22 in parallel, spaced relationship and include rubbed outer surfaces in contact with liquid crystal layer 20 that orient the adjacent liquid crystal molecules in a second direction perpendicular to the first direction. Electrodes 30 and 32 are formed of an electrically conductive transparent material, such as an indium tin oxide film. Pixels 36 are formed at intersections where an individual electrode 30 crosses an individual electrode 32 spaced apart by the liquid crystal material, and are separated by a matrix area 37 formed by linear spaces between the electrodes.

Pixels 36 are switchable between a transparent state having a bright appearance and an opaque state having a dark appearance. For this purpose, electrodes 30 and 32 are individually connected to leads of an electrical circuit (not shown) for selectively applying electrical current to particular electrodes to thereby apply a localized electrical potential to the pixel defined at the intersection. In forming a display, light illuminating back side 18 is filtered by polarizer 28 to admit only light that is polarized in a first plane. In the absence of an applied electrical field at a pixel, the polarized light is rotated by liquid crystal layer 20 to permit the light to pass through front polarizer 26, thereby creating a bright pixel for the display. However, electrical current applied to a particular electrode 30 and a particular electrode 32 alters the liquid crystal material at the pixel defined by the pair, thereby preventing the light from being rotated to pass through polarizer 26 and thus creating a dark pixel for the display. Thus, by applying an electrical potential between a pair of opposite electrodes, the pixel switches from a normal, transparent condition to an opaque condition. Upon discontinuance of the applied current, the pixel returns to the transparent condition.

Whether light is transmitted or blocked by a particular pixel, it is significant to this invention that the light is introduced through back side 18 of the liquid crystal panel 12 by backside illuminator 14. Illuminator 14 includes a transparent polymeric waveguide 40 having a thickness preferably between about 200 and 500 microns. Waveguide 40 is applied to a cladding 41, which are supported on a substrate 42. In this example, support 40 was formed of an opaque (white) alumina plate, but may be formed of any suitable material including metal or polymer. Waveguide 40 includes a front face 44 that faces back side 18 of liquid crystal panel 12 and is spaced apart by an air space. Face 44 consists of a planar matrix surface 46 adapted for internal light reflection and a plurality of light-emitting sites 48. In this example, light-emitting sites 48 are formed of square indentations in face 44 that extend partially through waveguide 40.

By way of an example, waveguide 40 is suitably composed of an aromatic acrylated epoxy resin having an index of refraction of about 1.525. Cladding 41 is composed of a aliphatic urethane dimethacrylate resin having an index of refraction less than the waveguide. To form the cladding, a liquid film comprising, by weight, about 58.9 parts urethane diacrylate compound, 10.4 parts tripropylene glycol diacrylate compound and 29.7 parts propoxylated glycerol triacrylate compound, in the presence of a photo-initiator compound, is spread onto substrate 42 and cured using ultraviolet light. The waveguide is formed from a polymeric precursor liquid containing, by weight, about 69.3 parts epoxy diacrylate compound and about 29.7 parts propoxylated glycerol triacrylate compound, together with a minor addition of a photo-initiator. The liquid is applied to the cladding, using spinning to distribute the liquid into a uniform thin layer, and cured by exposure to ultraviolet light to form the resin film that is the basis for the waveguide. At the desired sites 48, the cured film is selectively exposed to an excimer laser beam to ablate the polymer to form the indentations that constitute the light-emitting sites. The film may be scanned with the beam using a mask to limit ablation to the desired sites. Alternately, the individual sites 48 may be serially targeted and ablated using a square beam that is indexed from site to site to complete the array.

Waveguide 40 also includes a light-admitting edge 50. Light for the display is provided by light-emitting diodes 52, 54 and 56 mounted upon substrate 42 to emit light in a direction 58 toward edge 50, thereby optically coupling the diodes to waveguide 40. Diodes 52, 54 and 56 may be of a conventional type that emit a broad spectrum light. Alternately, diodes 52, 54 and 56 may be laser diodes that are selected individually to emit red, green and blue light, respectively, which colored light combines to produce a white light for the display.

Sites 48 are arranged in an array corresponding to pixels 36 and are aligned such that each indentation registers with a corresponding pixel. During operation, diodes 52, 54 and 56 are connected to a battery or like electrical power source to emit light into waveguide 40 as indicated by arrows 58, which light disperses laterally within the waveguide. It is a significant feature that waveguide 40 is formed of a resin having a relatively high index of refraction. Thus, at the interface with cladding 41, light is internally reflected to contain the light within the waveguide. Also, because the index of refraction of waveguide 40 is greater than the adjacent air, light rays intersecting matrix surface 46 are internally reflected to prevent light from being emitted there. However, at sites 48, a portion of the light is emitted in the direction indicated by arrows 60 toward the corresponding pixels 36 of liquid crystal panel 12. Depending upon the condition of the pixel, this emitted light is either transmitted or blocked to create the desired display.

Thus, this invention provides a liquid crystal display device 10 that includes a backside illuminator 14 that receives light from a suitable source and emits the light from sites 48 to selectively illuminate pixels 36 of a liquid crystal panel 12. Illuminator 14 features a nonemitting surface 46 between sites 48 that contains the light and prevents nonproductive illumination of the display matrix. By preferentially illuminating the pixels that process light in contrast to the matrix, the optical coupling effiency between the liquid crystal panel and the illuminator is improved. This supplies a greater proportion of the light from a source of predetermined capacity to be utilized in the display, thereby increasing the brightness of transmissive pixels. Alternately, this permits the electrical power requirements for the light source to be reduces while maintaining an optimum brightness for the display. In battery-powered devices, this permits operating time to be extended. Also, by eliminating spurious emission from matrix surface 46 toward the pixels, pixel resolution is improved. This is accomplished by an illuminator featuring a waveguide preferably less than 500 microns thick in the described embodiment, thereby permitting the thickness of the device to be reduced, with commensurate savings in weight, size and cost.

In the described embodiment depicted in FIGS. 1 and 2, light-emitting sites 48 are formed by square indentations having uniform area and depth. It is believed that, within a waveguide having a relatively high index of refraction compared to bordering materials, light rays incident upon a planar interface at low angles of incidence tend to be reflected, thereby directing the light rays along a path contained within the waveguide. At higher angles, light rays are permitted to pass through the interface and escape the waveguide. Sites 48 may be formed of any suitable irregularity in the face that modifies the angles of incidence of incident light rays to cause light to be emitted. Accordingly, light-emitting sites may be formed of indentations having semispherical, cylindrical or conical shapes, which feature a circular cross section, as well as multifaceted shapes. The area or depth of the indentations may be varied to adjust the intensity of emitted light. Increasing the area or depth is believed to increase the intensity of light emitted from the site. Since the intensity of light within a region of the waveguide is dependent upon the distance from the light source, sites remote from the light source may be enlarged or deepened relative to sites proximate to the light source to obtain more uniform light emission.

Figure 3:
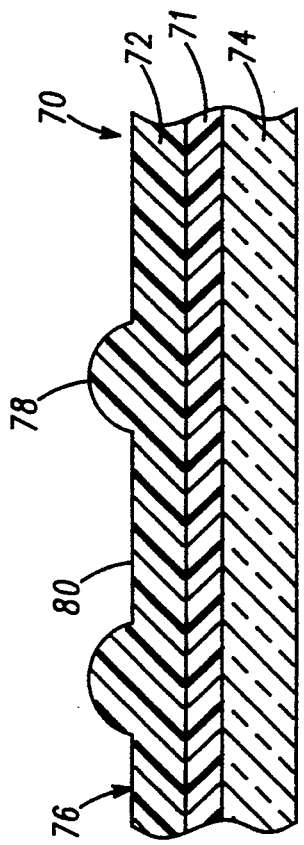
FIG. 3 is a cross sectional view showing a detail of a backside illuminator for a liquid crystal display device in accordance with an alternate embodiment of this invention.

Moreover, the light-emitting sites may be formed of irregularities that protrude relative to the planar matrix surface. Referring to FIG. 3, in an alternate embodiment of this invention, there is depicted a detail of a backside illuminator 70 for a liquid crystal display device similar to device 10 in FIGS. 1 and 2, but featuring light-emitting sites 78 of a different shape. Accordingly, illuminator 70 comprises an optical waveguide 72 applied to a cladding 71 on a substrate 74 and having a front face 76 adapted to face a back side of a liquid crystal panel in an arrangement similar to the arrangement between liquid crystal panel 12 and waveguide 14 in FIGS. 1 and 2. Sites 78 are surrounded by a non-emitting matrix surface 80 that is planar for internally reflecting light within the waveguide. However, in contrast to the indentations shown for waveguide 40 in FIG. 1, light-emitting sites 78 are generally hemisphereical bumps that emit toward the back side of a liquid crystal panel. As in the arrangement for FIG. 1, sites 78 are aligned in registration with pixels of a liquid crystal panel for preferentially illuminating the pixels that form the display. Waveguide 72 may be formed by applying and curing a polymeric material to form a planar layer, and thereafter ablating the area corresponding to matrix surface 80 about the desired sites 78 with a laser beam, whereupon associated heating of the adjacent polymer at sites 78 tends to produce a hemispherical contour. Alternately, waveguide 72 may be formed by casting and curing the polymeric liquid on a temporary platen having concave indentations to form the bumps and transferring the waveguide to the clad substrate. While in this embodiment generally hemispherical protrusions have been shown for sites 78, the sites may be formed of any suitable shape that alters the angle of incidence of light rays within the waveguide to permit light to be emitted. Furthermore, the protrusions may be uniformly sized or alternately may be varied in size to adjust light emission from a particular site.

Figure 4:
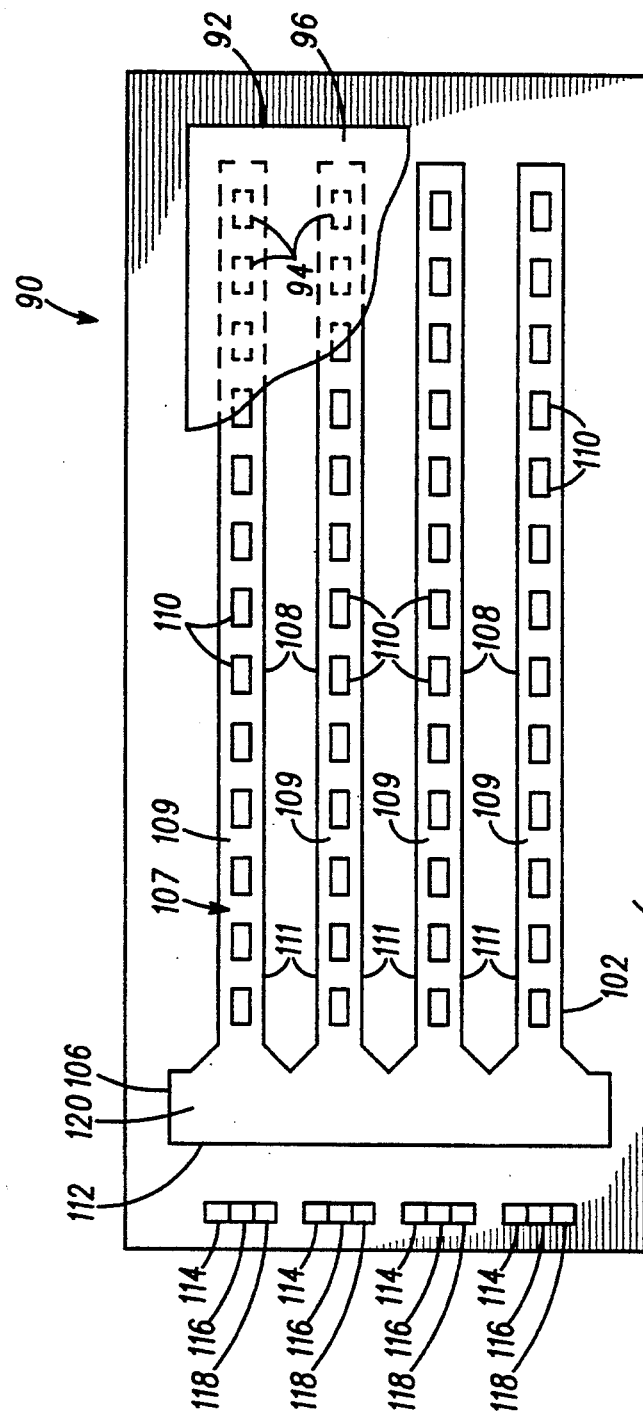
FIG. 4 is a plan view of a liquid crystal display device having a backside illuminator in accordance with another embodiment of this invention.

In still another embodiment of this invention depicted in FIG. 4, there is shown a liquid crystal display device 90 that includes a liquid crystal panel 92, similar to panel 12 in FIGS. 1 and 2 and comprising a plurality of pixels 94 spaced apart by a matrix 96. In accordance with this invention, device 90 includes a backside illuminator 100 that comprises an optical waveguide 102 carried on a substrate 104 immediately overlying a low refractive index polymeric cladding. Waveguide 102 comprises a light interdiffusion zone 106 and a series of laterally separated, parallel channels 108 extending from zone 106 so as to be optically coupled thereto. The outward face 107 of each channel 108 includes a planar, internally light reflective surface 109 and a longitudinal series of light-emitting sites 110. In the depicted embodiment, each light-emitting site 110 is formed of a square indentation similar to light-emitting sites 48 in FIGS. 1 and 2. Alternately, the light-emitting sites may be formed of protrusions similar to protrusion 78 in FIG. 3. Zone 106 includes a light-admitting edge 112. A series of laser diodes 114, 116 and 118 are disposed on substrate 104 and oriented to emit light in a direction toward edge 112. Diodes 114, 116 and 118 are selected to emit red, green and blue light, respectively, which light combines to produce a white light. In accordance with this embodiment of the invention, light from diodes 114, 116 and 118 enters zone 106 through edge 112 and diffuses therein to produce a uniform white light. Zone 106 includes a planar surface 116 effective to internally reflect the light within the zone. Light from the zone enters each channel 108 and travels therealong, contained by the planar surface 109 and the planar edges 111 that separate the channels. However, at sites 110, light is emitted toward the back side of liquid crystal panel 92. Illuminator 100 is arranged with liquid crystal panel 92 such that each light-emitting site 110 registers with a corresponding pixel 94, similar to the arrangement of light-emitting sites 48 and pixels 36 in FIGS. 1 and 2. Thus, backside illuminator 100 preferentially illuminates the pixels, while avoiding illumination of matrix regions of the liquid crystal panel, to provide improved optical coupling efficiency and optimization of pixel brightness and diode power requirements. The laterally discrete channels allow greater control of light intensity longitudinally along the channel. Thus, sites 110 may be more readily sized to permit more uniform light emission. Also, by confining light to channels 108, this embodiment minimizes the loss of light that might otherwise occur within interchannel regions.

In the described embodiments, the backside illuminator is depicted as a distinct element and spaced apart from the liquid crystal panel. Alternately, the illuminator may suitably be attached to the liquid crystal panel back side, provided that the material at the interface with the matrix surface has a suitably low refractive index to reflect the light internally within the waveguide. Mounting of the waveguide on the liquid crystal panel may advantageously reduce the thickness of the device, not only by eliminating the air space, but also eliminating the need for a substrate to support the waveguide. In still another embodiment, the illuminator may include a substrata having a reflective surface, either underlying the waveguide in its entirety or selectively underlying the light-emitting sites, to reflect light misdirected by the irregularity toward the front face for emission from the site.

Although this invention has been disclosed with reference to a particular liquid crystal panel having an simple matrix drive system, it may be adapted for use with any suitable liquid crystal panel having pixels featuring bright or dark conditions, including conventional panels that utilize active matrix drive systems.

While this invention has been described in terms of certain embodiments thereof, it is not intended that it be limited to the above description, but rather only to the extent set forth in the claims that follow.

The embodiments of this invention in which an exclusive property or privilege is claimed are defined as follows:

1. A light-emitting liquid crystal display device comprising
   a liquid crystal panel having a front side for viewing a display and a panel back side opposite the front side for admitting light to create the display, said liquid crystal, panel comprising a layer composed of a liquid crystal material and a plurality of electrodes in contact with the layer that cooperate to define a plurality of pixels for the display, each pixel being responsive to an electrical current applied to the electrodes that define the pixel to switch the pixels between a transparent state and an opaque state, said pixels being arranged in an array and separated by a matrix area, a backside illuminator that includes an optical waveguide comprising a plurality of channels, each channel having a front face toward said panel back side and comprising a plurality of light-emitting sites and a non-emitting matrix surface separating said sites, each said light-emitting site being disposed in registration with a corresponding pixel of said liquid crystal panel, said waveguide further comprising a light-admitting edge for admitting light to the optical waveguide, and a light source optically coupled to said light-admitting edge for providing light to said waveguide, whereby said light is contained within the waveguide by said non-emitting matrix surface and is emitted at said light-emitting sites toward the corresponding pixels to illuminate the pixels for forming a display.

2. A light-emitting liquid crystal display device in accordance with claim 1 wherein the backside illuminator comprises a non-emitting matrix surface that is substantially planar and effective to internally reflect light from the light source within the waveguide.

3. A light-emitting liquid crystal display device in accordance with claim 1 wherein illuminator further includes a substrate, said optical waveguide being supported upon the substrate, and further wherein the front face of the waveguide is spaced apart from the panel back side by an air space.

4. A light-emitting liquid crystal display device in accordance with claim 1 wherein the light-emitting sites are formed of indentations in the front face of the waveguide.

5. A light-emitting liquid crystal display device in accordance with claim 1 wherein the light-emitting sites are formed of generally hemispherical protrusions on the front face of the waveguide.

6. A light-emitting liquid crystal display device in accordance with claim 1 wherein the waveguide further includes a light interdiffusion zone for receiving light through the light-admitting edge and optically coupled to the channels for supplying light to the channels.

* * * * *